United States Patent Office 3,833,710
Patented Sept. 3, 1974

3,833,710
PROCESS FOR PURIFYING A GAS CONTAINING OXYGEN AND SULFUR COMPOUNDS
André Deschamps, Chatou, Claude Dezael, Maisons-Laffitte, and Philippe Renault, Noisy-le-Roi, France, assignors to Institute Francais du Petrole des Carburants et Lubrifiants, Rueil-Malmaison, France
Filed June 7, 1972, Ser. No. 260,653
Claims priority, application France, June 8, 1971, 7120818; Nov. 16, 1971, 7141068
Int. Cl. C01b 17/00, 17/02
U.S. Cl. 423—573
10 Claims

ABSTRACT OF THE DISCLOSURE

The purification process, which may be used for removing sulfur dioxide from industrial fumes, comprises several interconnected steps: absorption in a solution of alkali metal or ammonium sulfite, contact of the latter with a weak anion exchanger, for example an amine or a polymeric amine, periodic regeneration of the exchanger by means of ammonia, recycling of the absorption solution and conversion of the recovered ammonium sulfite to sulfur. The so defined process has low power requirements and yields sulfur practically free of by-products.

---

Figure 1:
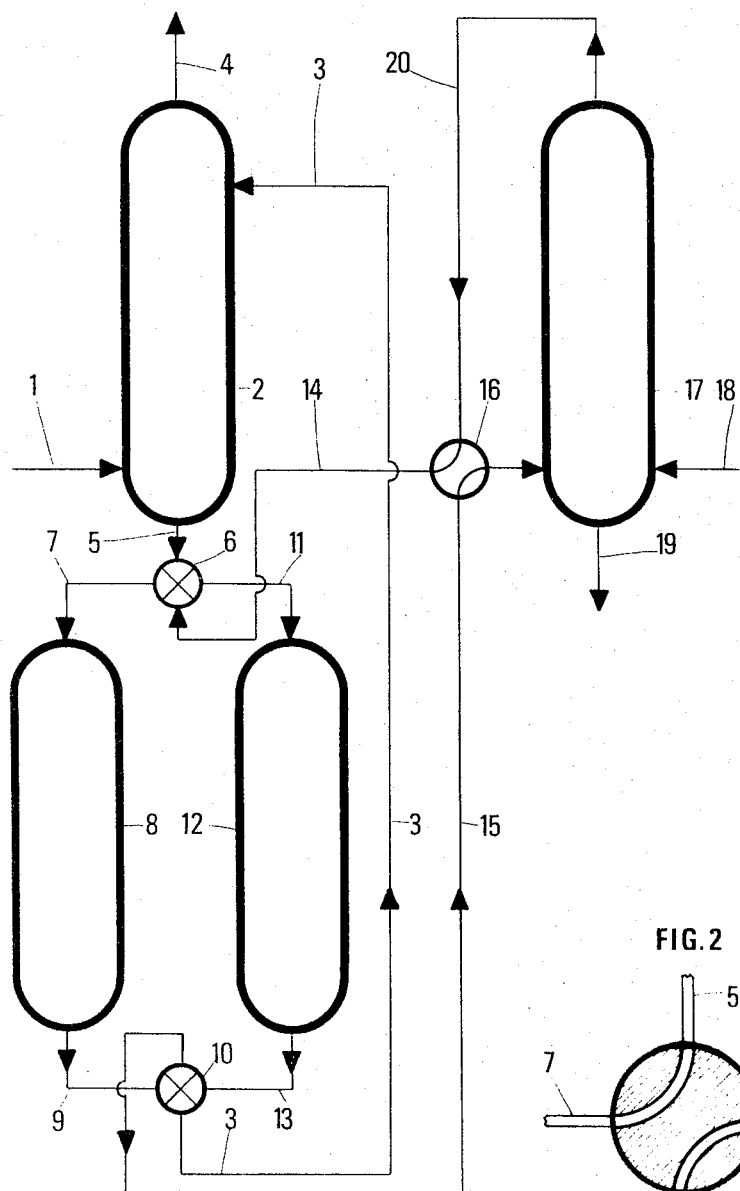

This invention relates to a process for removing sulfur dioxide from a gas containing it to produce elemental sulfur.

Many industrial fumes, particularly those from electricity plants fed with fuel or other sulfur containing combustible materials, the off-gases from chemical works and from incinerators used to burn sulfur containing compounds, contain sulfur dioxide which is a major polluting agent.

Ammonia has already been used in a process for removing sulfur dioxide from fumes. This process, which permits a good purification of these fumes, produces brines containing ammonium sulfite and bisulfite.

The concentration of these brines in sulfur dioxide in the form of ammonium sulfite and bisulfite must be low so as to obtain a high purification rate of the fume.

The applicants have described in the French Pat. No. 1,568,748 a process for regenerating ammonia and producing sulfur from these brines. This process consists of reducing ammonia sulfite and bisulfite to sulfur by means of hydrogen sulfide, which liberates ammonia according to the reactions:

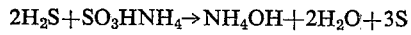
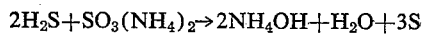

This may be obtained by reacting $H_2S$ with ammonium sulfite and bisulfite at a temperature of, for example, 90–170° C., in the presence of a solvent which may be, for example, a glycol. Instead of sulfites, it is possible to make use of the products of their thermal decomposition, i.e. a mixture of sulfur dioxide and ammonia.

It has been observed that the conversion of ammonium sulfite and bisulfite to sulfur is not always carried out with a high selectivity. There is formed, in addition to sulfur, not negligible amounts of oxygen compounds of sulfur such as thionates, thiosulfates, sulfates etc., when a diluted solution of sulfite or bisulfite is introduced into the reactor.

The concentration of these solutions and their thermal decomposition require a high power consumption.

It is an object of this invention to provide a process which avoids the above disadvantages. It results in a good purification of the sulfurous fumes, a direct production of sulfur and an economical conversion of the sulfurous compounds to sulfur with a high selectivity.

This process comprises the following steps: an industrial gas containing sulfur dioxide is contacted with a relatively diluted aqueous solution of ammonium or alkali metal neutral sulfite, at a temperature of about 0 to 90° C., so as to increase the corresponding hydrogen sulfite content of the aqueous solution and to decrease its neutral sulfite content, the resulting solution is contacted with a weak anion exchanger, so as to regenate the diluted solution of neutral sulfite and increase the sulfur dioxide content of the resin, the diluted solution of neutral sulfite is recycled to the contact zone for the industrial gas, the contact with the exchanger is periodically interrupted, the latter is treated with a relatively concentrated aqueous ammonia solution, so as to obtain a relatively concentrated aqueous solution of neutral ammonium sulfite and regenerate the exchanger, the latter is again contacted with the aqueous solution of higher hydrogen sulfite content, and the neutral ammonium sulfite of the relatively concentrated solution of this salt is converted to sulfur in a known manner.

The latter conversion may be carried out, as shown above, either by contacting ammonium sulfite in a relatively concentrated aqueous solution or in the solid state with hydrogen sulfide, or by reacting hydrogen sulfide with the sulfite decomposition products, essentially sulfur dioxide. The reaction is advantageously carried out in an organic solvent. The reaction temperature may be selected in the range of from 10 to 180° C., but the yield of sulfur may be considerably increased by working at 110–170° C. Below 100–110° C., substantial amounts of thiosulfate are formed, which may be converted to sulfur and ammonia, however at lower rates than the sulfites.

Neutral sodium, potassium and ammonium sulfites are examples of sulfites which may be used for treating the fumes. The aqueous solution of this sulfite may have, a concentration of, for example, from 0.01 M (mole per liter) up to the saturation. Concentrations of from 0.05 to 1.5 M are preferred, however, since they result in a better $SO_2$ recovery rate from the fumes. During this $SO_2$ absorption, the neutral sulfite is at least partly converted to the hydrogen sulfite. Usually, the neutral sulfite solution contains a substantial amount of the corresponding hydrogen sulfite.

The aqueous solution of the latter is contacted with an exchanger, for example a weak anionic resin, for example at 0–90° C. Resins of the polyamine type are examples of weak anionic resins, for example the products corresponding to the trademarks: Amberlite IR 45, IR 4 B, IRA 93, IRA 68, Duolite A–2, A–6 and A–114, Dowex–3, Dowex–4, Lewatit M, Permutit W and Deacidit IHP. The strong anionic resins, for example those of the quaternary ammonium type, cannot be used, as a rule, in the present process.

The regeneration of the resin may be carried out with a relatively concentrated aqueous ammonia solution, for example a solution at a concentration between about 2 M and the saturation, preferably 5 M to 15 M, at a temperature of, for example, from 0 to 90° C., preferably 30 to 50° C. There is thus obtained a solution of ammonium sulfite whose molar concentration is usually in the above range.

An amine of molecular weight higher than 200, hereinafter referred to as "liquid ion exchanger," may be used in place of the weak anionic resins hereinbefore described.

It has been found that, when the aqueous solution, enriched with ammonium or alkali metal hydrogen sulfite, was contacted with an organic liquid phase containing in solution one or more of these amines, the resulting aqueous solution consisted essentially of neutral sulfite and the sulfite ion was retained by the amines. The treatment of the organic phase satured with sulfite ions by an aqueous ammonia solution results in a neutral solution of neutral ammonium sulfite which will be converted to sulfur and ammonia in a known manner.

The primary, secondary and tertiary amines of high molecular weight, higher than 200, are examples of amines which may be used according to this invention, particularly, among the primary amines, 1-(3-ethylpentyl)-4-ethyloctylamine and a trialkylmethylamine, among the secondary amines a N-dodecenyl (trialkylmethyl)amine, a N-lauryl (trialkylmethyl) amine, bis(1-isobutyl-3,5-dimethylhexyl) amine, dilaurylamine, N-benzyl-1-(3-ethylpentyl)-4-ethyloctylamine, and, among the tertiary amines, methyldioctylamine,

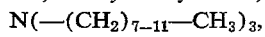

$$N(-(CH_2)_{7-11}-CH_3)_3,$$

tri-n-octylamine, tri-iso-octylamine, tribenzylamine, trilaurylamine, didodecenyl-n-butylamine and diisobutyl-n-octylamine. The alkyl group supra may contain, for example, 1–20 carbon atoms. These amines may be dissolved into inert solvents, for example pure hydrocarbons or mixtures thereof, particularly aromatic hydrocarbons. For example, a kerosene or a well-defined hydrocarbon fraction such as a xylene fraction, may be used.

This step is advantageously carried out at a temperature of, for example, 0–90° C. and preferably 40–60° C.

The amounts of aqueous phase containing the sulfites and of organic phase containing the amines, during the treatment, are advantageously in a ratio by volume of from 1/10 to 10/1 and preferably 1/4 to 4/1.

The contact between the two phases may be obtained in any liquid-liquid contact vessel, for example an extraction apparatus working in counter-current or co-current, of the packed type or with perforated trays, or a mere mixer-decanter comprising a stirring zone and a decantation zone.

The conversion of ammonium sulfite or of the mixture $SO_2+NH_3$ to sulfur is preferably carried out in an organic liquid. Although any inert organic liquid may be used, oxygen-containing solvents are preferred, particularly alcohols, glycols, glycerol, the esters and ethers of the latter, and phosphoric esters. Those whose have a normal boiling point higher than 200° C. are preferred.

Many organic solvents may be used in this step, for example tetramethylene sulfone, N-methyl pyrrolidone, heavy alcohols with, for example, 12–20 carbon atoms, alcohol esters, and, as a rule, any liquid inert at the reaction temperature with respect to such compounds as $H_2S$ and $CO_2$.

The following solvents, which have a high stability and result in particularly high reaction rates and selectivities, are preferred: alkylene glycols, ethers and esters of alkyleneglycols, polyalkyleneglycols and their ethers and esters, and, among the latter, ethylene glycol, polyethylene glycols, ethers and esters of polyethylene glycols. These solvents will be more generally referred to as "solvents of the glycol type."

Non-limitative examples are hereinafter given: ethylene glycol, triethylene glycol, heptaethylene glycol, di-1,3-propylene glycol, penta-1,3-propylene glycol, decaethylene glycol mono ethylether, tetra-1,4-butene glycol, polyethyleneglycol having an average molecular weight of about 400, hexaethylene glycol mono-propyl ether mono-acetate or mono-butyrate.

The proportion of hydrogen sulfide is preferably such that the molar ratio

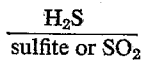

$$\frac{H_2S}{\text{sulfite or } SO_2}$$

be about 2, for example from 1.9 to 2.2. Hydrogen sulfide may be produced particularly by reacting sulfur with a hydrocarbon, or it may be supplied from the amine washing units of refineries or gas treating plants.

The process of the inventoin may be applied to the purification of gases which contain $SO_2$ as the sole acidic sulfur compound. The combustion fumes from electricity plants fed with fuel or any other sulfur containing combustible material are major examples of this type of gas. However the process may also be applied to such gases as the off-gases from Claus ovens which contain both $SO_2$ and compounds such as $H_2S$, COS and $CS_2$. It is then sufficient to transform said compounds to sulfur dioxide, for example by burning at a temperature of from 400 to 600° C. in the presence of oxygen, before subjecting them to the treatment of the invention.

The process applies particularly to gases with a low sulfur dioxide content, for example 0.02–10%, preferably 0.1–2% by volume. The $SO_3$ content is usually lower than the $SO_2$ content, for example 0.001–1% by volume.

The invention is illustrated by the accompanying drawings.

Figure 2:
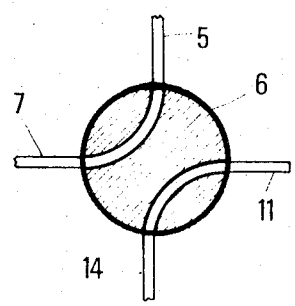
Figure 3:
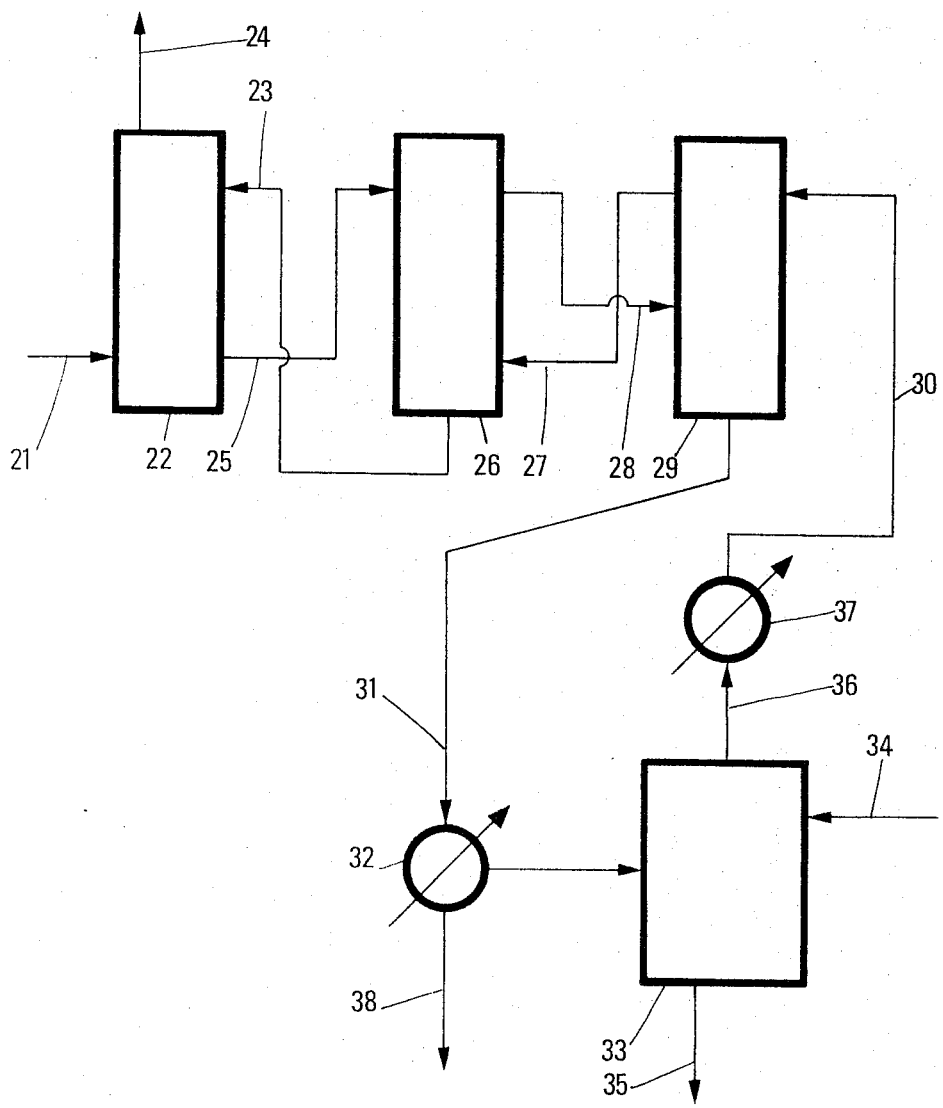

FIG. 1 is an overall diagram of the installation, and FIG. 2 is a detailed view of the two-position valves used in the installation of FIG. 1, and FIG. 3 diagrammatically shows a preferred embodiment.

On FIG. 1, the gas to be purified is introduced through pipe 1 into the contact tower 2. It contacts therein a diluted aqueous solution of sodium, potassium or ammonium neutral sulfite admitted through pipe 3. The purified gas evolves through chimney 4. The solution of neutral sulfite absorbs $SO_2$, so that the neutral sulfite is at least partly converted to hydrogen sulfite. The solution enriched with hydrogen sulfite of the same metal evolves through duct 5, the two-position valve 6, duct 7 and enters tower 8 containing an ion exchange resin of the amine or polyamine type. The resin retains $SO_2$ and the neutral sulfite is thus regenerated. The diluted solution of neutral sulfite is conveyed through duct 9 and the two-position valve 10 and is then returned through duct 3 to tower 2.

When the resin is substantially saturated with $SO_2$, the two-position valves 6 and 10 are actuated for a different connection; the diluted solution of the hydrogen sulfite then passes through line 11, tower 12 containing a resin of the above-mentioned type, line 13 and line 3. Tower 8 is then fed with an aqueous ammonia solution through line 14, valve 6 and line 7. This aqueous solution is withdrawn through line 9. It contains a large amount of neutral ammonium sulfite and also ammonia since it is advantageous to regenerate the resin with ammonia in excess. The aqueous solution is conveyed through the 2-way valve 10, line 15 and exchanger 16; in this exchanger, it is vaporized and the resulting vapor mixture of $SO_2$, $NH_3$ and $H_2O$ is reacted in tower 17 with hydrogen sulfide introduced through line 18. Tower 17 contains an organic liquid, for example a glycol or polyglycol at a temperature of, for example, 120–150° C.; liquid sulfur is formed and is withdrawn through line 19. The vapors, essentially steam and ammonia when the reaction between $SO_2$ and $H_2S$ is complete, are fed back through duct 20 to the exchanger 16 in which water is condensed; the resulting ammonia solution is fed back through line 14 to tower 8.

When the resin in tower 12 gets saturated with $SO_2$ and that of tower 8 has been regenerated, the two-position valves 6 and 10 are again actuated to a different position. Tower 8 is then operated again and regeneration performed in tower 12. The two-position valve 6 is then actuated to the position shown in FIG. 2. It is obvious that the two-position valve 10 is then in a different position.

A preferred embodiment is diagrammatically shown in FIG. 3.

The impure gas is fed from duct 21 to absorber 22. It contacts a diluted aqueous solution of neutral sodium sulfite admitted through pipe 23. The purified gas evolves through stack 24. The neutral sulfite solution absorbs $SO_2$ and the aqueous solution enriched with hydrogen sulfite evolves through duct 25 and is conveyed to the extractor 26 where it is counter-currently contacted with an organic solution consisting of an amine dissolved in hydrocarbons and admitted through pipe 27. The amine retains the sulfite ion and the regenerated solution containing the neutral sulfite is withdrawn from the bottom and recycled to absorber 22 through line 23. The organic phase, which has absorbed the sulfite ion, is withdrawn through pipe 28 from the top of the extractor and is conveyed to extractor 29, where it is counter-currently contacted with an ammonia solution supplied through line 30 and which, after regeneration, is withdrawn from the top and fed back through pipe 27 to absorber 26.

An aqueous solution containing a large proportion of ammonium neutral sulfite is recovered through duct 31. This solution is conveyed to exchanger 32 where it is vaporized and the resulting vapor mixture of $SO_2$, $NH_3$ and $H_2O$ is reacted, in reactor 33, with $H_2S$ introduced through line 34. However the vaporization unit 32 may be omitted and the sulfite solution directly supplied to reactor 33. The latter contains an organic liquid, for example a polyglycol, at a temperature of, for example, 120 to 180° C. Liquid sulfur is formed and is withdrawn through line 35. The vapors, essentially steam and ammonia when the reaction between $SO_2$ and $H_2S$ is complete, are fed back through pipe 36 to the exchanger 37 where water is condensed. The resulting ammonia solution is supplied to extractor 29 through line 30. If desired, only a portion of the liquid from line 31 is vaporized, the other portion being discharged as a purge.

The following non-limitative examples are given by way of illustration:

EXAMPLE 1

10,000 $Nm.^3$ per hour of a fume whose composition by volume is:

| | | |
|---|---|---|
| $SO_2$ | p.p.m. | 2000 |
| $SO_3$ | p.p.m. | 50 |
| $CO_2$ | percent | 12 |
| $H_2O$ | do | 12 |
| $N_2$ | do | 76 | are treated, in a column (2) maintained at a temperature of 50° C., with a solution of sodium sulfite containing 150 grams per liter of neutral sulfite and 16 grams of hydrogen sulfite (a).

The effluent from the bottom of column (2) contains 220 grams per liter of sodium hydrogen sulfite, 26 grams per liter of sodium neutral sulfite and 3.7 grams per liter of sodium sulfate (b). Its flow rate is 0.92 $m.^3$ per hour. It is fed to a column (8) containing 4 $m.^3$ of a resin Dowex 3–X–8.20–50 mesh at a temperature of 50° C.

$SO_2$ is absorbed by the resin and the solution withdrawn from the bottom of column (8) is sent to column (2) in which the absorption takes place; its composition is as given in (a).

The fume withdrawn from this absorption zone (2) contains only 50 p.p.m of $SO_2$.

After about one hour, the sulfite solution from column (2) is conveyed to a second column (12) of regenerated resin identical to (8); (8) is then regenerated by feeding the same with 260 liters of a concentrated ammonia solution 10 M. There is recovered an effluent containing 400 g. per liter of ammonium neutral sulfite, 11 g. per liter of ammonium sulfate and an excess of ammonia which is vaporized and sent to a reactor. $H_2S$ is also introduced at 130° C. in the presence of a solvent (polyethylene glycol of average molecular weight 400). There is recovered sulfur from the bottom of the reactor and ammonia and steam which are thereafter condensed, from the top. The ammonia solution thus obtained is used for regenerating the resin columns.

EXAMPLE 2

Example 1 is repeated with the same fume, but there is used a solution of potassium sulfites containing 50 g. per liter of neutral sulfite and 2 g. per liter of hydrogen sulfite. The effluent from the column 2 contains 64 g. per liter of potassium hydrogen sulfite, 10 g. per liter of the neutral sulfite and 1 g. per liter of potassium sulfate. Its flow rate is 3.55 $m.^3$ per hour. It is passed through the same resin as in Example 1.

The fume contains only 50 p.p.m. of $SO_2$ by volume.

After about 2 hours, the resin is regenerated with 500 liters of a 10 M ammonia solution and there is obtained an effluent containing 418 g. per liter of ammonium sulfite plus ammonia in excess. The subsequent operations are as in Example 1.

EXAMPLE 3

Example 1 is repeated with the same fume, but using a solution of ammonium sulfite containing 10 g. per liter of the neutral sulfite and less than 0.1 g. per liter of the hydrogen sulfite.

The effluent from the bottom of column (2) contains 13 g. per liter of ammonium hydrogen sulfite and 2.5 g. per liter of ammonium neutral sulfite. Its flow rate is 13.7 $m.^3$ per hour.

The fume contains not more than 40 p.p.m. of $SO_2$ by volume.

The sulfite effluent is passed through 1 $m.^3$ of a IRA 68 resin. After 1 hour of run, the regeneration is carried out with 260 liters of ammonia 10 M; the effluent contains 400 g. per liter of ammonium sulfite plus ammonia in excess.

The subsequent operations are as in example 1

EXAMPLE 4

10,000 $Nm.^3$ per hour of a fume whose composition by volume is:

| | | |
|---|---|---|
| $SO_2$ | p.p.m. | 2000 |
| $SO_3$ | p.p.m. | 50 |
| $CO_2$ | percent | 12 |
| $H_2O$ | do | 12 |
| $N_2$ about 76%. | | | are treated in an absorber (22) maintained at about 50° C., with an aqueous solution (a) containing 100 g. per liter of sodium neutral sulfite and 5 g. per liter of sodium hydrogen sulfite.

The effluent (b) is recovered from the bottom of the absorber (22) at substantially the same flow rate; it contains 110 g. of sodium hydrogen sulfite, 35 g. of neutral sodium sulfite and 2.5 g. of sodium sulfate per liter. Its flow rate is 1.87 $m.^3$ per hour.

It is conveyed to the top of an extractor (26) where it meets, in counter-current contact, a solution of trioctylmethylamine in xylene, the proportions of the mixture being 50–50 by volume. The temperature in extractor (26) is 40° C. The ratio of the feeding rates of extractor (26) respectively with the aqueous phase and the organic phase is 4/1.

The sulfite ion is absorbed and the solution recovered from the bottom of the extractor (26) has substantially the same composition as that of solution (a). The fume withdrawn from the absorption zone (22) contains only 10 p.p.m. of $SO_2$.

The organic phase withdrawn from extractor 26 is conveyed to another extractor 29 in which a concentrated 10 M ammonia solution is injected. The effluent from the last extractor, containing 200 g. of neutral ammonium sulfite per liter, 600 g. of ammonium hydrogen sulfite per liter and 3 g. of neutral ammonium sulfate per liter, is vaporized, purged to remove the sulfates and sent to a reactor (33) also supplied with $H_2S$. This reactor contains polyethylene glycol of an average molecular weight of 400, maintained at 130° C. There is recovered sulfur from the bottom of the reactor and from the top thereof, ammonia and steam, which are thereafter condensed. The resulting ammonia solution is sent to extractor 29.

EXAMPLE 5

Example 4 is repeated, except that the aqueous absorption solution (a) contains 126 g. of potassium neutral sulfite and 5.75 g. of potassium hydrogen sulfite per liter. There is obtained an effluent (b) containing 44 g. of potassium neutral sulfite, 127 g. of potassium hydrogen sulfite and 2.5 g. of potassium sulfate per liter.

The fume contains only 10 p.p.m. of $SO_2$.

The effluent (b) is treated with a solution of N-lauryl-N-(tripropylmethyl) amine in a kerosene fraction, at a concentration of 40% by volume.

Subsequent operations are as in Example 4.

EXAMPLE 6

Example 4 is repeated, except that the aqueous absorption solution (a) contains 0.8 mole of ammonium neutral sulfite and 0.048 mole of ammonium hydrogen sulfite per liter. There is obtained an effluent (b) containing 0.278 mole of ammonium neutral sulfite and 1.05 mole of ammonium hydrogen sulfite per liter.

The fume contains only 10 p.p.m. of $SO_2$.

The effluent (b) is treated with a solution of tri-n-octylamine in xylene at a concentration of 30% by volume.

Subsequent operations are as in Example 4.

What we claim as our invention is:

1. A process for removing sulfur dioxide from a sulfur dioxide containing gas, which comprises the steps of contacting the gas with a first aqueous solution of alkali metal or ammonium sulfite, at about 0–90° C., so as to convert at least a part of said sulfite to the corresponding alkali metal or ammonium hydrogen sulfite, removing a $SO_2$-depleted gas and an aqueous solution enriched with alkali metal or ammonium hydrogen sulfite, contacting the resulting enriched solution with a weak anion exchanger, so as to regenerate the first aqueous sulfite solution and increase the sulfur dioxide content of the exchanger, separating the regenerated solution from the exchanger and recycling said separated solution to the zone of contact with the sulfur dioxide containing gas, periodically interrupting the contact with the exchanger, treating the out-of-contact exchanger with an aqueous solution of ammonia, so as to obtain a second aqueous solution of ammonium sulfite and regenerate the exchanger, separating said second aqueous solution, contacting the exchanger again with the first alkali metal or ammonium hydrogen sulfite solution and reacting the ammonium sulfite of the second aqueous solution or the $SO_2$ and $NH_3$ containing gas resulting from its vaporization with $H_2S$, thus obtaining sulfur.

2. A process according to claim 1, in which the concentration of the first aqueous sulfite solution is from 0.01 M to saturation.

3. A process according to claim 1, in which the concentration of the first aqueous sulfite solution is from 0.05 M to 1.5 M.

4. A process according to claim 1, in which the aqueous ammonia solution used to treat the out-of-contact exchanger has a concentration from 2 M up to the saturation.

5. A process according to claim 1, in which the weak anion exchanger is an anionic resin of the polyamine type.

6. A process according to claim 1, in which the weak anion exchanger is an amine of molecular weight higher than 200.

7. A process according to claim 6, in which the amine is used as a solution in a liquid hydrocarbon.

8. A process according to claim 7, in which the ratio by volume of the alkali metal or ammonium hydrogen sulfite enriched solution to the amine solution is from 1/10 to 10/1.

9. A process according to claim 1, in which the conversion of the ammonium sulfite of the second aqueous solution to sulfur is carried out in liquid glycol.

10. A process according to claim 1, in which the treated gas also contains sulfur trioxide.

References Cited
UNITED STATES PATENTS

| | | | |
|---|---|---|---|
| 3,503,185 | 3/1970 | Delzeme et al. | 55—73 |
| 3,620,674 | 11/1971 | Renault et al. | 423—243 |
| 3,297,401 | 1/1967 | Sakomura et al. | 423—321 |
| 3,561,925 | 2/1971 | Deschamps et al. | 423—573 |

OSCAR R. VERTIZ, Primary Examiner

G. A. HELLER, Assistant Examiner

U.S. Cl. X.R.

210—37; 423—242; 574